United States Patent
Takata et al.

(10) Patent No.: US 6,884,836 B2
(45) Date of Patent: *Apr. 26, 2005

(54) POLYOLEFIN BASED RESIN FILM AND A COMPOSITION FOR A POLYOLEFIN TYPE RESIN FILM

(75) Inventors: Atsuhiro Takata, Toyonaka (JP); Ryuma Kuroda, Ibaraki (JP); Satoshi Hanada, Ibaraki (JP); Takeshi Yamada, Takatsuki (JP)

(73) Assignee: Sumitomo Chemical Company, Limited, Osaka (JP)

( * ) Notice: Subject to any disclaimer, the term of this patent is extended or adjusted under 35 U.S.C. 154(b) by 163 days.

This patent is subject to a terminal disclaimer.

(21) Appl. No.: 10/103,773

(22) Filed: Mar. 25, 2002

(65) Prior Publication Data

US 2002/0156167 A1 Oct. 24, 2002

(30) Foreign Application Priority Data

Mar. 30, 2001 (JP) .......................................... 2001-100230

(51) Int. Cl.$^7$ .............................. C08J 3/00; C08K 5/01; C08L 98/01
(52) U.S. Cl. ........................ 524/487; 524/474; 524/488; 524/489; 524/490; 524/570
(58) Field of Search .................................. 524/474, 487, 524/488, 489, 490, 570

(56) References Cited

U.S. PATENT DOCUMENTS 5,292,584 A * 3/1994 Howard et al. ............. 428/327

FOREIGN PATENT DOCUMENTS

| EP | 1 168 469 A2 | 1/2002 |
|---|---|---|
| EP | 1 201 295 A2 | 5/2002 |
| EP | 1 241 220 A2 | 9/2002 |
| JP | 5-209069 A | 8/1993 |
| JP | 10-306119 A | 11/1998 |
| JP | 11-106533 | * 11/1999 |

* cited by examiner

Primary Examiner—Patrick D. Niland
(74) Attorney, Agent, or Firm—Sughrue Mion, PLLC

(57) ABSTRACT

To provide a polyolefin based resin film of high elastic modulus and a composition for producing a polyolefin based resin film of high elastic modulus. The polyolefin based resin film is characterized in that a polyolefin [A] having a weight average molecular chain length of 2850 nm or more and a polyolefin wax [B] having a weight average molecular weight of 700 to 6000 have been compounded in a ratio of [A]/[B]=90/10 to 50/50 (by weight) as the resin component, and 10 to 300 parts by weight of inorganic fillers have been added to 100 parts by weight of the resin component.

4 Claims, 4 Drawing Sheets

POLYOLEFIN BASED RESIN FILM AND A COMPOSITION FOR A POLYOLEFIN TYPE RESIN FILM

TECHNICAL FIELD

The present invention relates to a polyolefin based resin film of high elastic modulus and a composition for producing a polyolefin based resin film of high elastic modulus.

PRIOR ART

As one material of high-strength and high-modulus film, an ultrahigh-molecular-weight polyolefin is known. However, the ultrahigh-molecular-weight polyolefin has high melt viscosity due to its ultrahigh molecular weight and is hardly formed into a film by film-thinning and stretching. Accordingly, the commercially available ultrahigh-molecular-weight polyolefin film is generally produced by slicing a block resin.

However, while a film can be obtained by slicing the ultrahigh-molecular-weight polyolefin, the film is inferior in its thickness accuracy and partially poor in its strength and elastic modulus, thus making preparation of high-strength and high-modulus film difficult.

SUMMARY OF THE INVENTION

An object of the present invention is to provide a high-density and high-modulus polyolefin based resin film and a composition for producing a high-density and high-modulus polyolefin based resin film.

The present inventors made extensive study for developing a polyolefin based resin film having high elastic modulus and capable of producing with good production efficiency, and as a result, they found that the problem described above can be solved by forming a composition, which compounds a polyolefin having a specific molecular chain length, a polyolefin wax of a specific weight average molecular weight and inorganic fillers in a specific ratio, into a film, and the present invention was thereby completed.

That is, the polyolefin based resin film of the present invention is characterized in that a polyolefin [A] having a weight average molecular chain length of 2850 nm or more and a polyolefin wax [B] having a weight average molecular weight of 700 to 6000 have been compounded in a ratio of [A]/[B]=90/10 to 50/50 (by weight) as the resin component, and 10 to 300 parts by weight of inorganic fillers have been added to 100 parts by weight of the resin component.

When [A]/[B] exceeds 90/10 to increase the proportion of the polyolefin [A], processability is lowered, while when the proportion of the polyolefin wax [B] exceeds 50 to decrease [A]/[B] to less than 50/50, the elastic modulus of the resultant film is lowered.

The density ρ1 (g/cm$^3$) of the polyolefin [A] and the density ρ2 (g/cm$^3$) of the polyolefin wax [B] are preferably in the following relationship:

0.92≦ρ1≦0.94

0.91≦ρ2≦0.93

−0.01≦(ρ1−ρ2)≦0.03

When the relationship between the density ρ1 of the polyolefin [A] and the density ρ2 of the polyolefin wax [B] does not satisfy the relationship described above, the uniformity of the composition is insufficient, and when the composition poor in uniformity is stretched to form a film, there may occur a problem such as break.

The average particle diameter of the inorganic fillers in the polyolefin based resin film is preferably 1 μm or less.

By decreasing the average particle diameter of the added inorganic fillers to 1 μm or less, a polyolefin based resin film of higher elastic modulus can be obtained.

Preferably, the polyolefin based resin film of the present invention has been stretched in the TD direction in the range of 2 to 10 times.

By such stretching, the composition is formed into a polyolefin based resin film of high elastic modulus in the TD direction. The TD direction refers to a direction perpendicular to both the thickness direction of the sheet and the machine direction (MD direction) of the film or sheet upon formation from the starting composition for the polyolefin based resin film by a film-making process such as extrusion, calendering etc.

A composition for a polyolefin based resin film according to the present invention is characterized in that a polyolefin [A] having a weight average molecular chain length of 2850 nm or more and a polyolefin wax [B] having a weight average molecular weight of 700 to 6000 have been compounded in a ratio of [A]/[B]=90/10 to 50/50 (by weight) as the resin component, and 10 to 300 parts by weight of inorganic fillers have been added to 100 parts by weight of the resin component.

PREFERRED EMBODIMENT OF THE INVENTION

Figure 1:
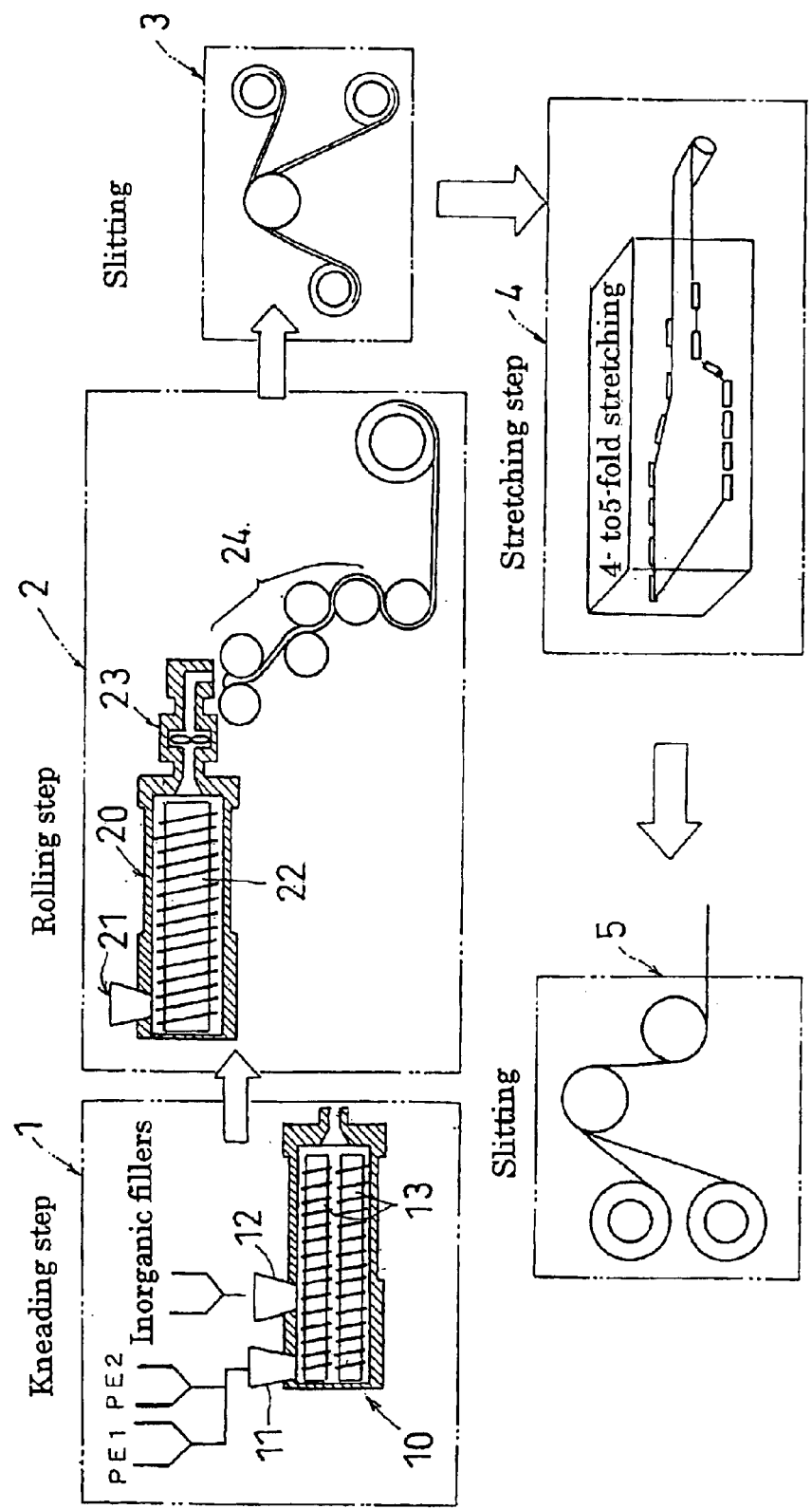
FIG. 1 is a schematic view showing a process for producing a polyolefin based resin.

An example of an olefin constituting a polyolefin [A] used in the present invention includes known olefin such as ethylene, propylene, butene and hexene.

The polyolefin used is a polyolefin having a weight average molecular chain length of 2850 nm or more. When the weight average molecular chain length is less than 2850 nm, molecular chains in the polyolefin are insufficiently intertwined thus making it difficult to obtain a high-strength and high-modulus film from the composition of the present invention.

As the polyolefin [A], an ultrahigh-molecular-weight polyethylene and ultrahigh-molecular-weight polypropylene having a weight average molecular weight of 5×10$^5$ or more is preferably used.

A polyolefin wax [B] in the present invention is characterized by having a weight average molecular weight of 700 to 6000. When a polyolefin wax having a weight average molecular weight of less than 700 is used, the polyolefin [A] and the polyolefin wax [B] in the composition are easily separated from each other, and the polyolefin wax is easily bled from the composition. On the other hand, when a polyolefin wax having a weight average molecular weight of greater than 6000 is used, the melt viscosity of a mixture of the polyolefin [A] and the polyolefin wax [B] is increased, and thus a uniform composition is hardly obtained, a film produced from such a composition is partially poor in strength and elastic modulus, and a high-strength and high elastic modulus film is hardly obtained.

Concrete examples of the polyolefin wax [B] include polyethylene type resin such as low-density polyethylene, linear polyethylene (ethylene-a-olefin copolymer) and high-density polyethylene, polypropylene type resin such as polypropylene and ethylene-propylene copolymer, and wax such as poly(4-methylpentene-1), poly(butene-1) and ethylene-vinyl acetate copolymer.

The molecular chain length, the weight average molecular chain length, the molecular weight and the weight average molecular weight of the polyolefin can be measured by GPC (gel permeation chromatography), and the proportion of the mixed polyolefin (% by weight) in the specific range of molecular chain length or the specific range of molecular weight can be determined by integration of a molecular-weight distribution curve obtained by GPC measurement.

As the inorganic fillers used in the present invention, known inorganic fillers can be used without limitation. Specifically, examples thereof include metal salts such as calcium carbonate, magnesium carbonate, barium carbonate, calcium sulfate, magnesium sulfate and barium sulfate, metal hydroxides such as aluminum hydroxide and magnesium hydroxide, and metal oxides such as calcium oxide, magnesium oxide, titanium oxide, alumina and zinc oxide, as well as talc, clay, kaolin, silica, hydrotalcite, diatomaceous earth, mica, zeolite, glass powder etc.

The inorganic fillers are preferably those subjected to treatment with a coupling agent in order to improve dispersibility and to increase the mechanical strength of the resultant film. As the coupling agent, any known coupling agents can be used without limitation, and specifically, examples thereof include silane coupling agents (for example, various silane coupling agents are commercially available from Nippon Unicar Co., Ltd.), titanium coupling agents (for example, various titanium coupling agents are commercially available from Ajinomoto Co., Ltd.) and zirconium coupling agents. The inorganic fillers can be treated with the coupling agent by placing the inorganic fillers in a stirrer, then stirring the fillers while spraying them with the coupling agent dissolved in a suitable organic solvent, and drying the fillers having the coupling agent adhering thereto.

The composition for producing the polyolefin based resin film according to the present invention can contain various kinds of additives and fillers as necessary in addition to the inorganic fillers. Such additives include organic fillers such as antioxidants, UV absorbers, pigments and fine resin powder.

Preferably, the polyolefin based resin film and the composition for the polyolefin based resin film according to the present invention contain at least 10% by weight of a polyolefin based resin having a molecular chain length of 2850 nm or more. The polyolefin based resin having a molecular chain length of 2850 nm or more is particularly superior in strength, so that by containing at least 10%, preferably 20% by weight of such resin, a polyolefin based resin film significantly superior in strength can be obtained.

The composition for producing the polyolefin based resin film according to the present invention can be obtained by mixing the starting ultrahigh-molecular-weight polyolefin with the polyolefin wax in a kneading unit having high shearing force. Specifically, a Banbury mixer, a kneader and a mixing roll for kneading rubber and a screw kneading unit used for kneading thermoplastic resin can be mentioned.

When the screw kneading unit is used, the unit is preferably the one having a screw of an L/D of 30 or more provided with at least a full-flighted screw of an Lf/D of 3 or more and a kneading block of an Ln/D of 5 or more and satisfying the following relationships:

(Relationships) $35 \leq \alpha \leq 60$ $0.15 \leq (M/D) \leq 0.25$ wherein $\alpha$ is the flight angle (°) of the full-flighted screw; M is the screw flight (mm) of the full-flighted screw; L is the whole length (mm) of the screw; D is the diameter (mm) of the barrel; Ln is the element length (mm) of the kneading block provided that when two or more kneading blocks are contained in the screw, Ln is the sum of the respective element lengths; Lf is the element length (mm) of the full-flighted screw provided that when two or more flighted screws are contained in the screw, Lf is the sum of the respective element lengths Unlike a Banbury mixer and a kneader, a screw kneading unit can be preferably used in successive processing steps necessary for film production, such as calendering step, a stretching step etc. after kneading.

With reference to drawings, an embodiment of the present invention will be described as an example in a case where a screw kneading unit is used as a kneading unit.

(Film-Making Process)

FIG. 1 is a schematic view showing a production line for producing the polyolefin based resin film. This production line consists of a kneading step 1, a rolling step 2, a first slitting step 3, a stretching step 4 and a second slitting step 5.

In the kneading step 1, a screw kneading unit 10 is used, and this kneading unit is provided with a first hopper 11 for feeding a polyolefin PE1 having a weight average molecular chain length of 2850 nm or more and a polyolefin wax PE2 and a second hopper 12 for feeding fillers including inorganic fillers. The screw kneading unit 10 is provided with twin screws 13 by which the mixed resin and fillers fed from the hoppers 11, 12 are forcibly kneaded and extruded forward. The polyolefin based resin film-producing composition obtained by kneading is formed into pellets.

In the rolling step 2, a screw extruding unit 20 is used. The unit 20 is provided with a hopper 21 for introducing the resin composition pellets obtained in the kneading step 1 and with a screw 22. In the unit 20, the resin composition is extruded forward and discharged as a bar- or sheet-shaped molten resin through die 23, to obtain a film to be rolled by the pressure roll mechanism 24. The length direction of the resulting film is the MD direction.

In the first slitting step 3, the film obtained in the rolling step 2 is cut into two pieces in the width direction, whereby the film of e.g. 600 mm in width is cut into two films of 300 mm in width.

In the stretching step 4, the above film of 300 mm in thickness is stretched 2 to 10 times, preferably 4 to 5 times, in the TD direction (width direction). The polyolefin based resin film stretched in the TD direction can thereby be obtained.

In a preferable embodiment, a thermally fixing step for thermally fixing at a temperature of about (Tm-10) to (Tm-5) ° C. which is lower than the melting point Tm of the polyolefin based resin film composition may be provided after the stretching step.

In the second slitting step 5, the polyolefin based resin film obtained in the stretching step 4 is cut into films having desired width.

(Constitution of Screw Kneading Unit)

Figure 2:
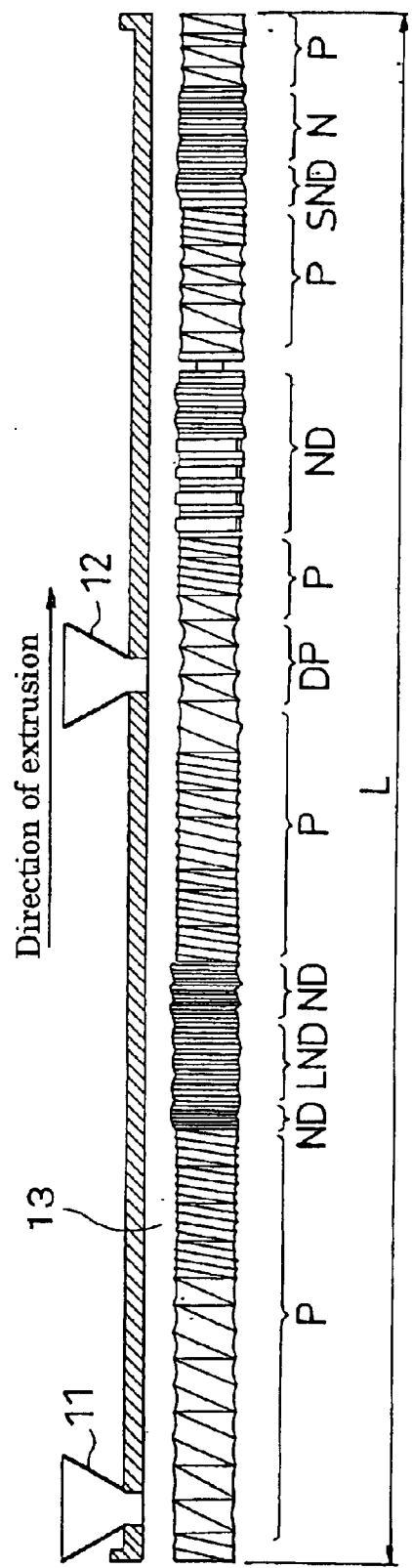
FIG. 2 shows a screw in a screw kneading unit.

Then, the constitution of the screw 13 in the screw kneading unit 10 preferable for production of the composition for producing the polyolefin based resin film according to the present invention is described in more detail. FIG. 2 shows a detail of a constitution of the screw 13.

Screw 13 is constituted by fixing a part called an element onto a shaft called a screw shaft.

Figure 3:
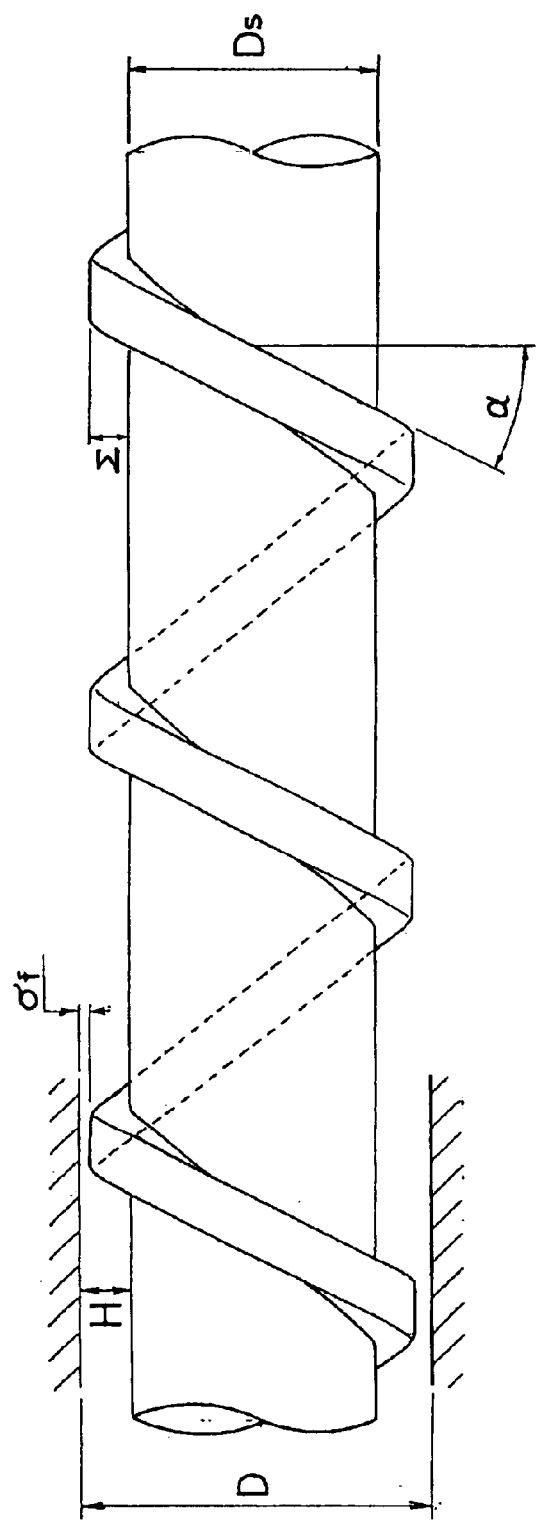
FIG. 3 shows a constitution of a full-flight disk in the screw kneading unit.

In FIG. 2, the element indicated by the symbol P is a full-flighted screw. The full-flighted screw is a screw segment having a spiral groove provided over the whole length of the screw. The element indicated by the symbol DP is a full-flight screw having a deeper groove than that of the full-flighted screw P. By use of the full-flighted screw having such a deeper groove, the retention time of the resin can be prolonged. The full-flighted screw has the shape shown in FIG. 3, and usually sends the kneaded material forward (i.e. downstream of the kneading unit). In FIG. 3, D is the diameter (inner diameter) (mm) of the barrel, Ds is the diameter (mm) of the screw, M is the depth (mm) of the screw groove, α is the flight angle (°) of the screw, H is the distance (mm) between the inner face of the barrel and the bottom of the screw groove, and δf is the distance (mm) between the screw flight and the inner face of the barrel.

Out of the parameters described above, α is related to the speed of delivering the resin, and as α is decreased, the speed of delivering the resin is decreased, and as a result, the retention time of the resin is prolonged to improve the mixing degree of the resin. However, when α is made too small, production efficiency is deteriorated. M is also a parameter related to the delivery speed and mixing degree of the resin.

The element indicated by the symbol ND is a kneading block. In the kneading block, as usually shown in FIG. 4, a plurality of kneading disks having the same sectional shape, while the geometrical center of each disk is positioned on a common straight line, are stacked at a predetermined different angle in a predetermined direction around the straight line. The thickness of each kneading disk may be the same or different.

In the barrel to which the screw was inserted, the distance between the kneading disks constituting the kneading block and the barrel is varied, and the kneading material at the site where the distance is minimum undergoes the highest shear stress.

The element indicated by the LND is a kneading block having kneading disks stacked and twisted in the opposite direction to the twist of the kneading disks in the kneading block ND. By using the two kinds of kneading blocks ND and LND in combination, the retention time of the kneading material can be made longer than by one kind of kneading block, and stronger shear stress can thereby be given.

The element indicated by the symbol SND is also a kneading block and characterized in that when its two neighboring kneading disks are compared, the kneading disk downstream of the kneading unit is thinner than the kneading disk upstream thereof. By using the kneading block SND, the rate of the kneaded material flowing to the side downstream of the kneading unit can be regulated, and a stronger action of compression and stretching can be given to the kneaded material.

Figure 4:
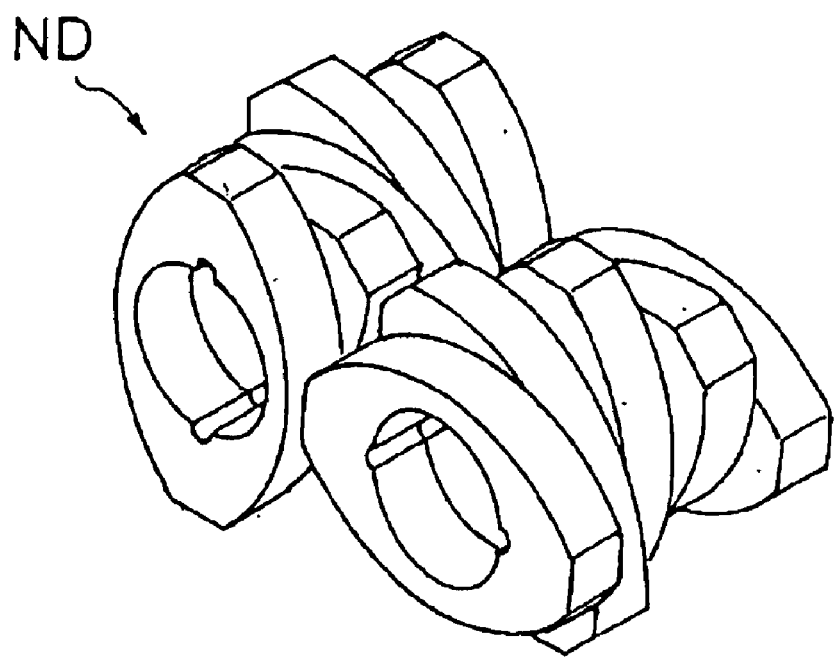
FIG. 4 shows a constitution of a kneading disk in the screw kneading unit.

FIG. 4 shows the kneading block inserted in a twin-screw extruder wherein the screw shaft is not shown.

The screw kneading unit suitable for preparing the composition for producing the polyolefin based resin film according to the present invention is set such that the L/D of the whole screw is 30 or more, the Ln/D of the kneading block is 5 or more, and the Lf/D of the full-flighted screw is 3 or more. For the full-flighted screw, the parameters are designed such that $35 \leq \alpha \leq 60$ while $0.15 \leq (M/D) \leq 0.25$. As L/D is increased, the retention time is prolonged. By selecting the parameters as described above, it is possible to obtain the polyolefin based resin composition which can be molded into a film of high elastic modulus.

What is claimed is:

1. A polyolefin based resin film wherein a polyolefin [A] having a weight average molecular chain length of 2850 nm or more and a polyolefin wax [B] having a weight average molecular weight of 700 to 6000 have been compounded in a ratio of [A]/[B]=90/10 to 50/50 (by weight) as the resin component, and 10 to 300 parts by weight of inorganic fillers have been added to 100 parts by weight of the resin component wherein the density ρ1 (g/cm³) of said polyolefin [A] and the density ρ2 (g/cm³) of said polyolefin wax [B] are in the following relationship:

$0.92 \leq \rho1 \leq 0.94$ $0.91 \leq \rho2 \leq 0.93$ $-0.01 \leq (\rho1-\rho2) \leq 0.03$.

2. The polyolefin based resin film according to claim 1, wherein the average particle diameter of said inorganic fillers is 1 μm or less.

3. The polyolefin based resin film according to claim 1, which has been stretched in the TD direction in the range of 2 to 10 times.

4. A composition for a polyolefin based resin film wherein a polyolefin [A] having a weight average molecular chain length of 2850 nm or more and a polyolefin wax [B] having a weight average molecular weight of 700 to 6000 have been compounded in a ratio of [A]/[B]=90/10 to 50/50 (by weight) as the resin component, and 10 to 300 parts by weight of inorganic fillers have been added to 100 parts by weight of the resin component wherein the density ρ1 (g/cm³) of said polyolefin [A] and the density ρ2 (g/cm³) of said polyolefin wax [B] are in the following relationship:

$0.92 \leq \rho1 \leq 0.94$ $0.91 \leq \rho2 \leq 0.93$ $-0.01 \leq (\rho1-\rho2) \leq 0.03$.

* * * * *